United States Patent
Smith

(10) Patent No.: US 12,179,544 B2
(45) Date of Patent: Dec. 31, 2024

(54) CONVERTIBLE LINK FOR AN ANTI-SWAY BAR

(71) Applicant: Shock Therapy Suspension, Inc., Duluth, GA (US)

(72) Inventor: Justin Smith, Phoenix, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 17/931,169

(22) Filed: Sep. 12, 2022

(65) Prior Publication Data

US 2023/0302869 A1    Sep. 28, 2023

Related U.S. Application Data

(63) Continuation of application No. 17/027,320, filed on Sep. 21, 2020, now Pat. No. 11,446,975.

(60) Provisional application No. 62/903,577, filed on Sep. 20, 2019.

(51) Int. Cl.
*B60G 21/055* (2006.01)

(52) U.S. Cl.
CPC .... *B60G 21/0558* (2013.01); *B60G 2202/135* (2013.01); *B60G 2202/413* (2013.01); *B60G 2204/4604* (2013.01)

(58) Field of Classification Search
CPC ............ B60G 21/0551; B60G 21/0553; B60G 21/0555; B60G 21/0558; B60G 21/073; B60G 2204/46; B60G 2204/4604; B60G 2204/4605; B60G 2202/135; B60G 2202/413; B60G 2206/427; B60G 2204/1224
See application file for complete search history.

(56) References Cited

U.S. PATENT DOCUMENTS

| | | | |
|---|---|---|---|
| 5,004,264 | A | 4/1991 | Tetsuji |
| 5,505,480 | A | 4/1996 | Robert |
| 6,276,693 | B1 | 8/2001 | Oakley et al. |
| 11,332,190 | B1 * | 5/2022 | Shepherd ............... F16F 9/0209 |
| 11,493,106 | B2 * | 11/2022 | Krause ..................... F16F 9/585 |

(Continued)

FOREIGN PATENT DOCUMENTS

| | | | | |
|---|---|---|---|---|
| DE | 3924918 | A * | 2/1990 | ........... B60G 17/018 |
| DE | 102019111488 | A1 * | 11/2020 | ............. B60G 15/06 |

OTHER PUBLICATIONS

Description Translation for DE 102019111488 from Espacenet (Year: 2019).*

*Primary Examiner* — Jason D Shanske
*Assistant Examiner* — Daniel M. Keck
(74) *Attorney, Agent, or Firm* — Schmeiser, Olsen & Watts LLP

(57) ABSTRACT

A convertible link for use with an anti-sway bar is provided. The convertible link includes a hydraulic cylinder having a link tube and a fluid shaft. The fluid shaft includes a piston coupled to a first end of the fluid shaft, wherein the fluid shaft and the piston are slidably coupled within the link tube. Fluid flows in and out of the hydraulic cylinder to move the hydraulic cylinder between a fixed and a moveable condition. In the fixed position the fluid shaft does not move with respect to the link tube and the anti-sway bar is operational to control roll. In the moveable condition the fluid shaft is moveable with respect to the link tube and the anti-sway bar is not operational to control roll.

4 Claims, 10 Drawing Sheets

(56) References Cited

U.S. PATENT DOCUMENTS

| 2006/0163825 | A1  |  7/2006 | Alton          |
|--------------|-----|---------|----------------|
| 2006/0180966 | A1  |  8/2006 | Shidehiko      |
| 2008/0269987 | A1  | 10/2008 | Barron et al.  |
| 2016/0068034 | A1* |  3/2016 | Smith ............... B60G 11/265 |
|              |     |         | 280/124.107 |
| 2020/0156432 | A1* |  5/2020 | Cavarec ........... B60G 21/0558 |
| 2020/0361272 | A1* | 11/2020 | Jackson ........... B60G 21/0556 |
| 2023/0062757 | A1* |  3/2023 | Krause ............... F16F 9/3242 |
| 2024/0035540 | A1* |  2/2024 | Krause ................. F16F 9/58 |

* cited by examiner

CONVERTIBLE LINK FOR AN ANTI-SWAY BAR

CROSS REFERENCE TO RELATED APPLICATION[S]

This application is a continuation of U.S. patent application entitled "CONVERTIBLE LINK FOR AN ANTI-SWAY BAR," Ser. No. 17/027,320, filed Sep. 21, 2020, which claims priority to U.S. Provisional Patent Application "CONVERTIBLE LINK FOR AN ANTI-SWAY BAR," Ser. No. 62/903,577, filed Sep. 20, 2019, the disclosures of which are hereby incorporated entirely herein by reference.

BACKGROUND OF THE INVENTION

Technical Field

This invention relates generally to a link for an anti-sway bar and more particularly to a convertible link for an anti-sway bar.

State of the Art

An anti-sway bar is usually a torsion spring that resists body roll motions. As seen in FIG. 1, an anti-sway bar 50 is typically constructed out of a cylindrical steel bar in a U-shape, coupled to the left and right side suspensions 54. If the left and right wheels move together, the bar 50 rotates about its mounting points. If the wheels move relative to each other, the bar 50 is subjected to torsional forces. Each end of the bar 50 is connected to a link 52 through a flexible joint. The sway bar link 52 may connect to a lower control arm 56 of suspension 54, transferring forces from a heavily-loaded axle to the opposite side.

Anti-sway bars provide two main functions. The first function is the reduction of body lean and to tune the handling balance of a vehicle. There are certain vehicles that seek to have the benefits of an anti-sway bar during some times and then the benefit of independent suspension at other times. However, these conventional anti-sway bars to not include a mechanism for easily converting between the function of an anti-sway bar and the function of independent suspension.

Accordingly, there is a need for an improvement in the field of anti-sway bars.

SUMMARY OF THE INVENTION

The present invention relates to a convertible link for an anti-sway bar, wherein the convertible link converts between a fixed link and a moveable link, thereby converting the suspension between an engaged anti-sway bar suspension to an independent suspension.

In an embodiment, the present invention includes a convertible link for use with an anti-sway bar, the convertible link comprising: a hydraulic cylinder comprising a link tube; and a fluid shaft having a piston coupled to a first end of the fluid shaft, wherein the fluid shaft and the piston are slidably coupled within the link tube, wherein fluid flows in and out of the hydraulic cylinder to move the hydraulic cylinder between a fixed and a moveable condition, wherein in the fixed position, the fluid shaft is fixed with respect to the link tube and the anti-sway bar is operational to control roll and in the moveable condition, the fluid shaft is moveable with respect to the link tube and the anti-sway bar is not operational to control roll.

In another embodiment, the present invention includes a vehicle comprises a frame and suspension; an anti-sway bar coupled to the frame; and a convertible link coupled between the anti-way bar and the suspension, wherein the convertible link comprises a hydraulic cylinder comprising: a link tube; and a fluid shaft having a piston coupled to a first end of the fluid shaft, wherein the fluid shaft and the piston are slidably coupled within the link tube, wherein fluid flows in and out of the hydraulic cylinder to move the hydraulic cylinder between a fixed and a moveable condition, wherein in the fixed position, the fluid shaft is fixed with respect to the link tube and the anti-sway bar is operational to control roll and in the moveable condition, the fluid shaft is moveable with respect to the link tube and the anti-sway bar is not operational to control roll.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a convertible link for an anti-sway bar, wherein the convertible link converts between a fixed link and a moveable link, thereby converting the suspension between an engaged anti-sway bar suspension to an independent suspension.

In certain vehicles, such as off-road vehicles, there is the need and desire to have both an independent suspension and a semi-independent suspension depending on the terrain that the off-road vehicle is travelling. For example, if the off-road vehicle is traveling over very uneven terrain, such as boulder and the like, an independent suspension is desired in order to maintain traction even on uneven surfaces. Then, when the off-road vehicle is travelling along a more defined surface, such as a road or dirt road, it is desirable to reduce the roll and create a more semi-independent suspension wherein the movement of one wheel suspension affects the other wheel to provide more stability when turning and travelling on the more even surfaces.

Figure 1:
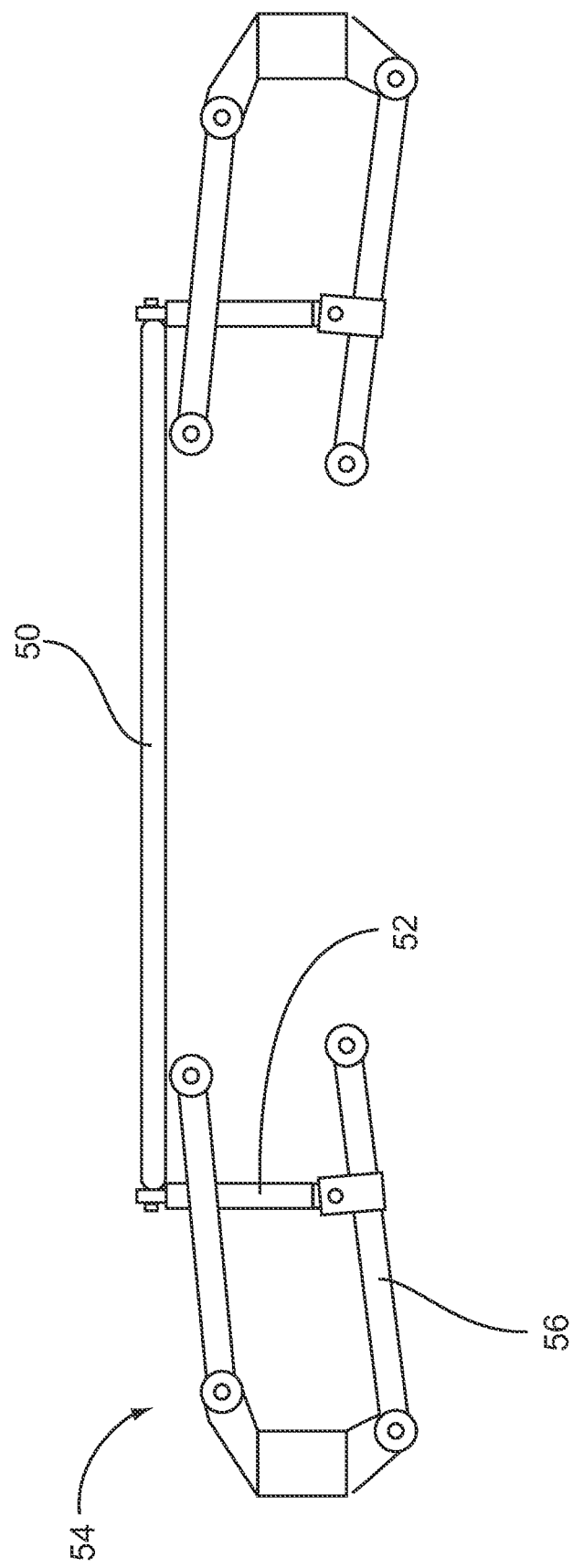
FIG. 1 is a front view of an anti-sway bar with a fixed link.
Figure 2:
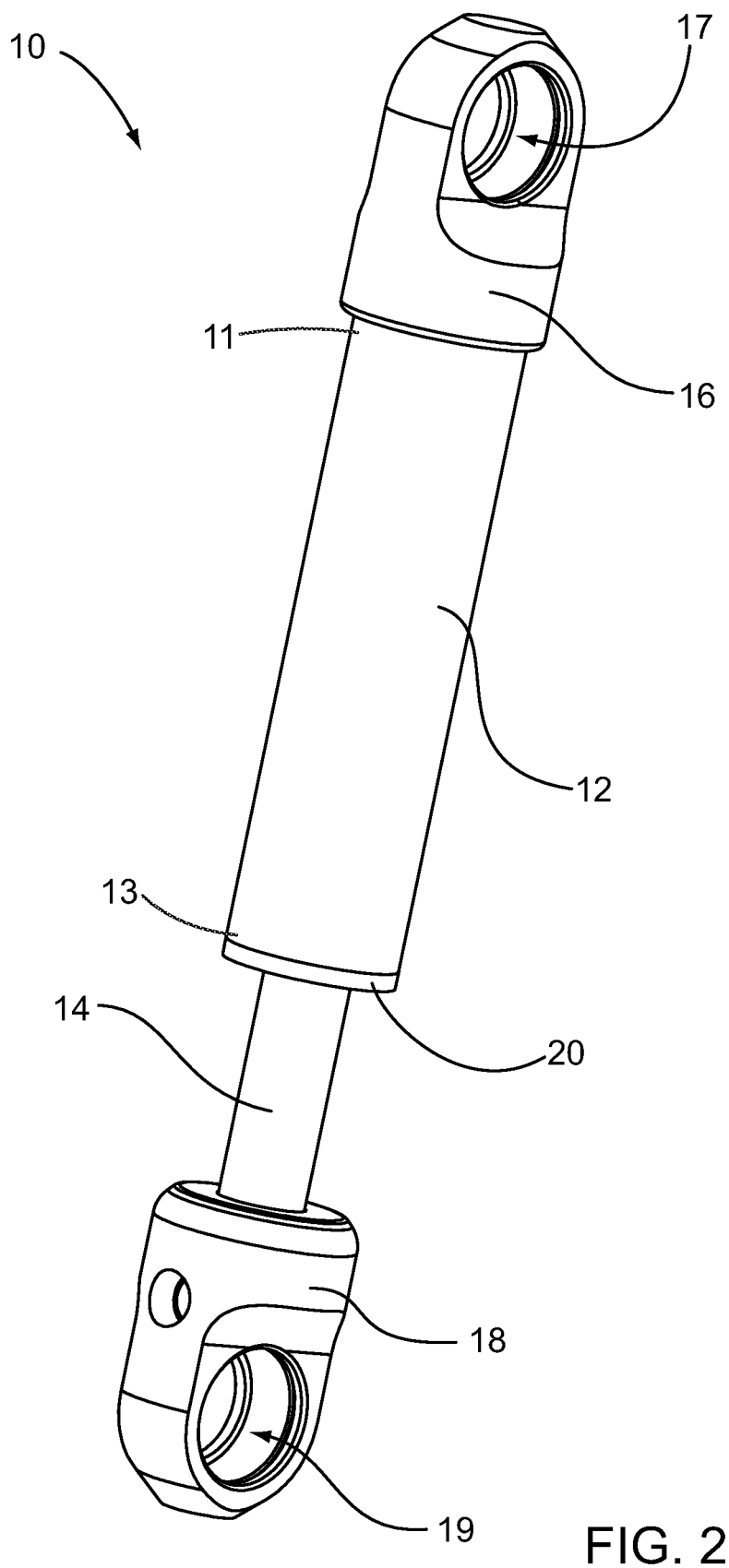
FIG. 2 is a perspective view of a convertible link for use with an anti-sway bar.
Figure 3:
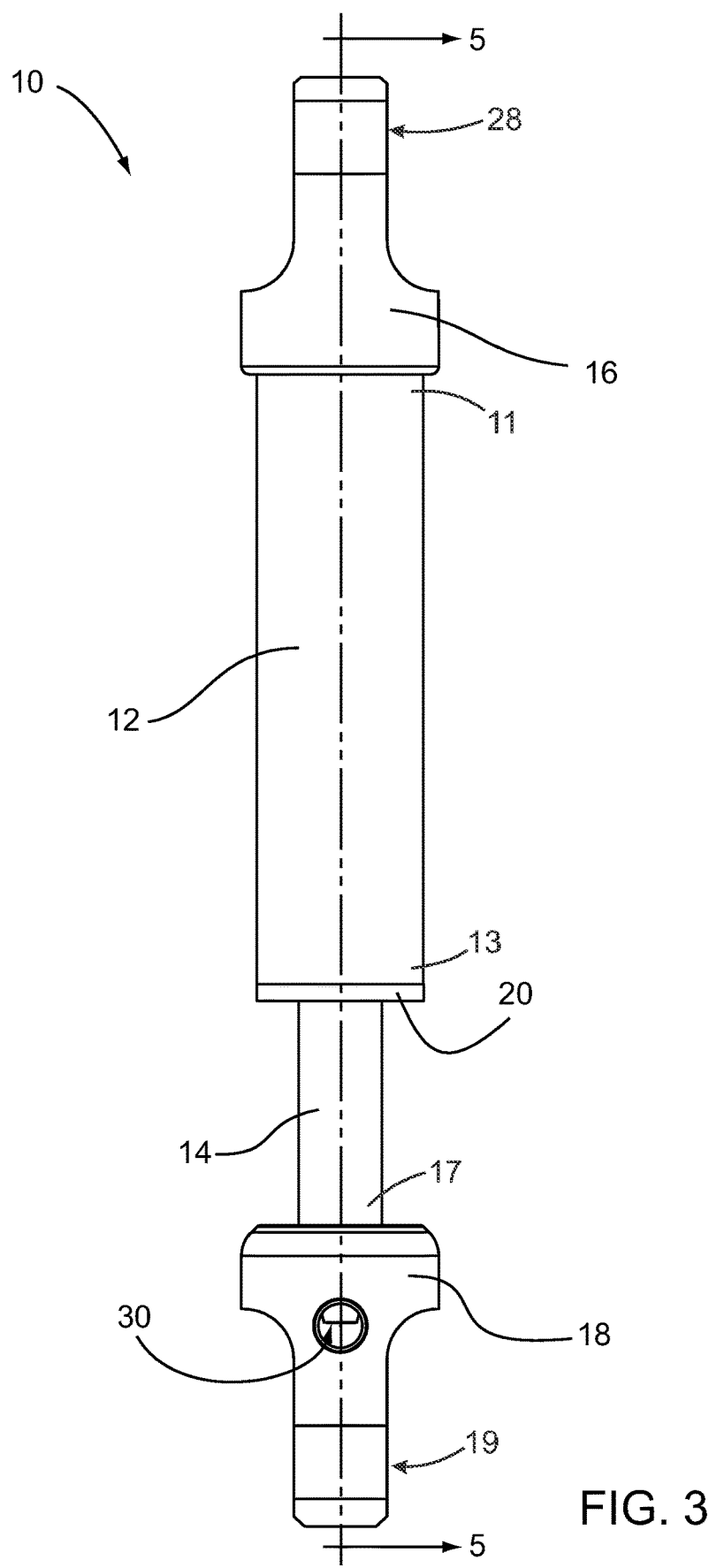
FIG. 3 is a side view of a convertible link for use with an anti-sway bar.
Figure 4:
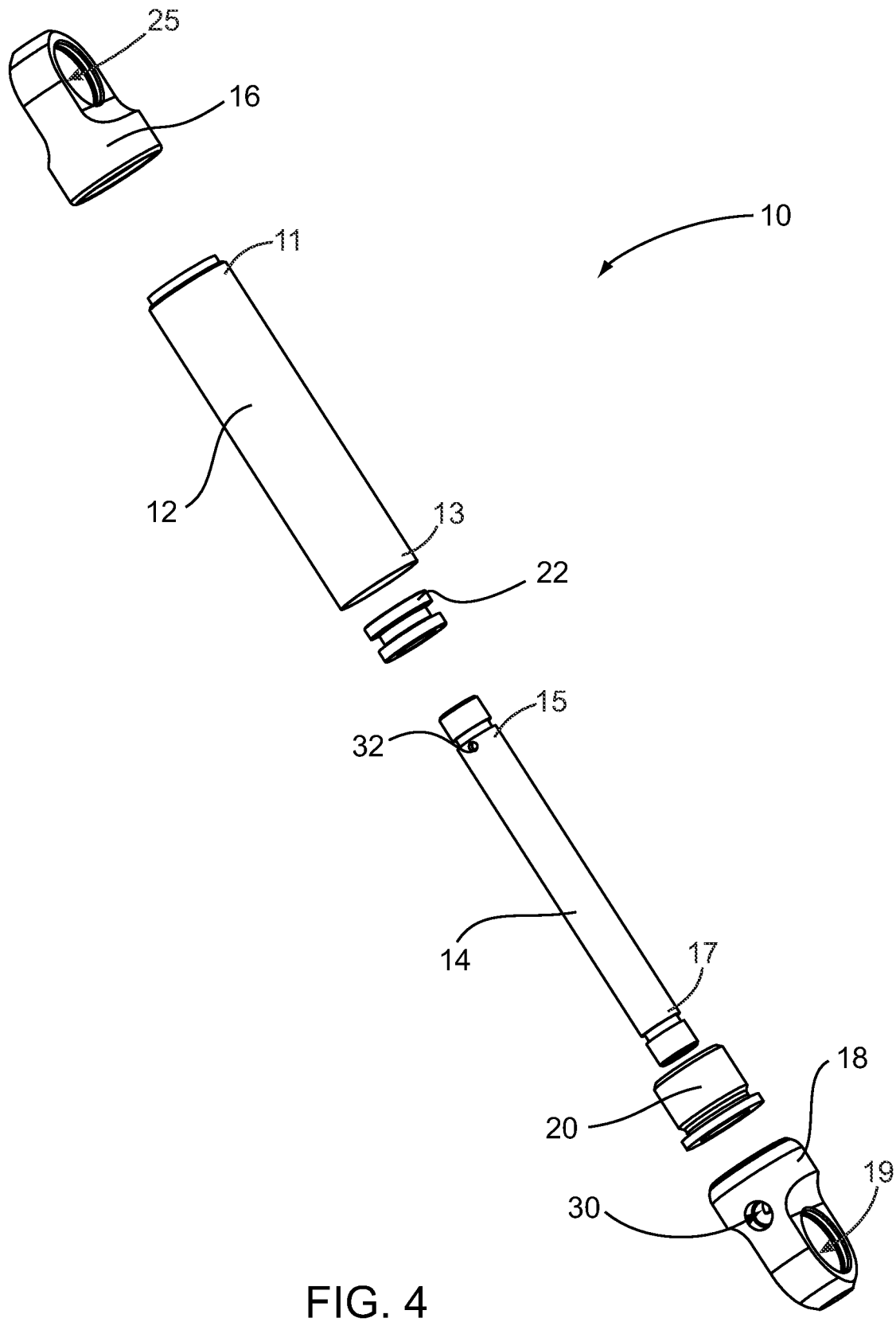
FIG. 4 is an exploded view of a convertible link for use with an anti-sway bar.
Figure 5:
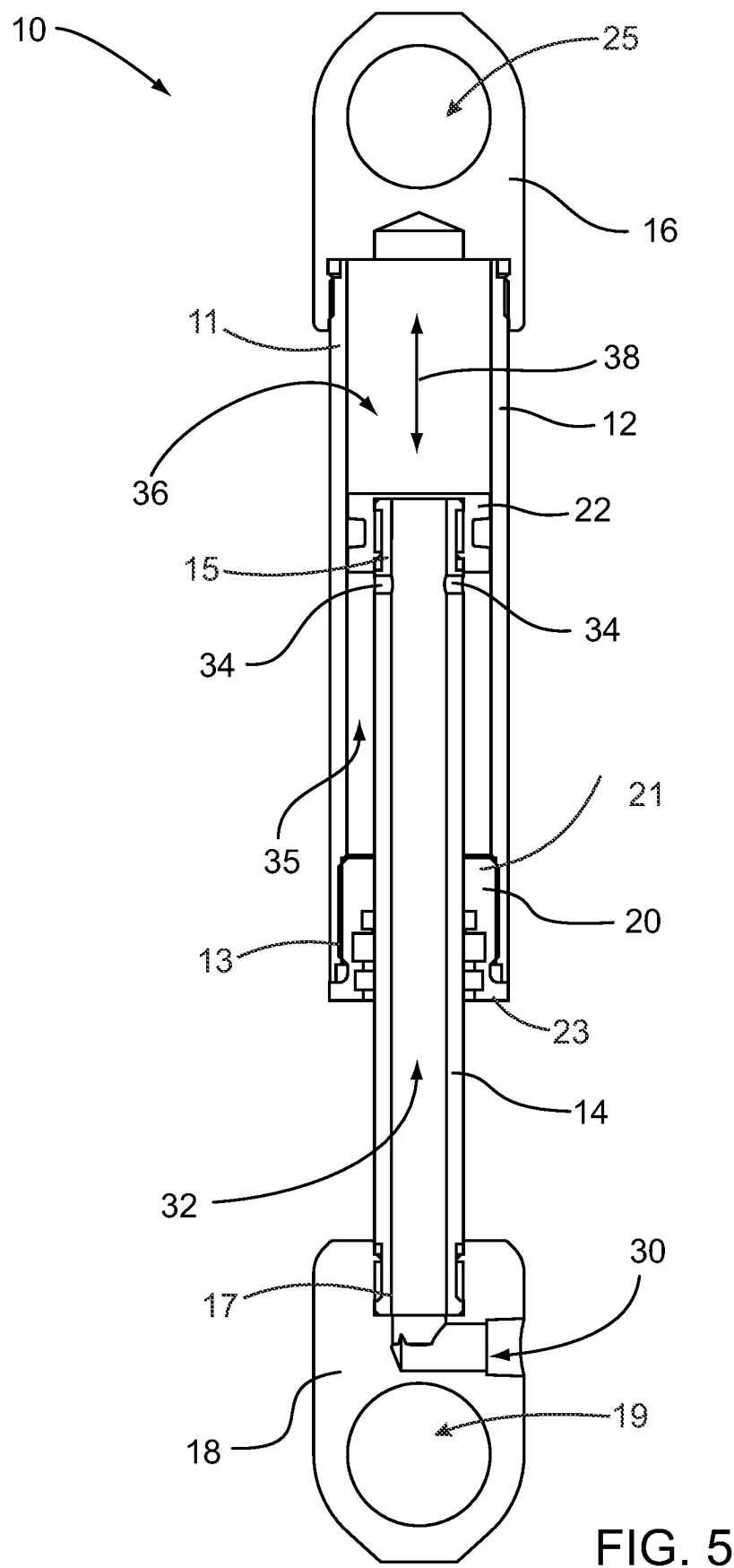
FIG. 5 is a section view taken along line 5-5 of FIG. 3 of a convertible link for use with an anti-sway bar.

Current methods require the removal of the linkage of the anti-sway bar in order to accomplish this. However, embodiments of the present invention as shown in FIGS. 2-5, overcome this limitation of current anti-sway links. FIGS. 2-5 depict a convertible link 10 for use with an anti-sway bar. Convertible link 10 replaces link 52 shown in FIG. 1, wherein convertible link 10 may be coupled between anti-sway bar 50 and control arm 56 of suspension 54.

Convertible link 10 may by a hydraulic cylinder and include a link tube 12, a fluid shaft 14, a link cap 16, a fluid shaft cap 18, an end cap 20 and a piston 22. Link tube 12 may include a first end 11 and a second end 13. Link cap 16 is coupled to first end 11 of link tube 12. Link cap 16 comprises an aperture 25 used to couple link cap 16 to anti-sway bar 50. Fluid shaft 14 may include a first end 15 and a second send 17. Piston 22 is coupled to first end 15 of fluid shaft 14 and fluid shaft cap 18 is coupled to second end 17 of fluid shaft 14. Fluid shaft cap 18 comprises an aperture 19 used to couple fluid shaft cap 18 to control arm 56. End cap 20 includes an aperture extending through end cap 20, wherein fluid shaft 14 extends through the aperture and end cap 20 is located between piston 22 and fluid shaft cap 18. The inner diameter of end cap 20 may be substantially the same as the outer diameter of fluid shaft 14. This allows for a fluid seal between fluid shaft 14 and the inner surface of end cap 20.

Link tube 12 may include an aperture 32 extending through the length of link tube 12, wherein piston 22 is inserted within the aperture 32 and is slidably coupled within link tube 12. The inner diameter of link tube 12 may be substantially the same as the outer diameter of piston 22. This allows for a fluid seal between piston 22 and the inner surface of link tube 12. Additionally, end cap 20 has a protrusion 21 extending from a base 23, wherein protrusion 21 is coupled to second end 13 of link tube 12. The inner diameter of link tube 12 is of a size to interfere with the outer diameter of protrusion 21 of end cap 20. In at least this way, end cap 20 is coupled to first end 13 of link tube 12 by an interference fit, thereby providing a fluid seal between end cap 20 and link tube 12 and further axially aligning link tube 12 and fluid shaft 14. It will be understood that while an interference fit is discussed in this disclosure, other ways of coupling end cap 20 to second end 13 of link tube 12 may be accomplished.

Coupling fluid shaft 14 to fluid shaft cap 18 places fluid shaft 14 in fluid communication with fluid shaft cap 18. When fluid shaft 14 is coupled to fluid shaft cap 18, a fluid inlet of fluid shaft cap 18 aligns with a fluid line 32. Fluid line 32 may comprise an inner volume within fluid shaft 14 or may be any similar type of means to transfer fluid. Fluid shaft 14 may include fluid outlet 34 that is in fluid communication with fluid line 32. This allows fluid to flow from fluid inlet 30 through fluid line 32 and out fluid outlet 34. When fluid shaft 14 is coupled to link tube 12, fluid flowing from fluid inlet 30 through fluid outlet 34 may enter inner volume 35 defined between the inner surface of link tube 12 and outer surface of fluid shaft 14 and between piston 22 and end cap 20. The fluid may flow under and increase pressure between piston 22 and end cap 20. The increase in pressure forces piston 22 to slide within link tube 12 in a direction indicated by arrow 38, wherein movement of piston 22 reduces inner volume 36 defined within link tube 12 between link cap 16 and piston 22. When fluid is not under pressure forcing the flow of fluid into inner volume 35, piston 22 is free to move in any direction indicated by arrow 38. This movement is generally determined by the off-road vehicle suspension movement. For example, as a wheel goes over uneven surfaces, the wheel will move up and down causing the suspension to react in similar up and down rotational movements. These up and down rotational movements result in movement of piston 22 in each direction depicted by arrow 38. This results in movement of fluid shaft in and out of link tube 12.

Accordingly, when fluid is flowed under pressure from fluid inlet 30 through fluid line 32 and out fluid outlet 34, the fluid is maintained under pressure to convert suspension 54 into a semi-independent suspension wherein anti-sway bar 50 is engaged to reduce roll of the vehicle while driving. When pressure is release from the fluid, the suspension 54 is converted into an independent suspension.

Figure 6:
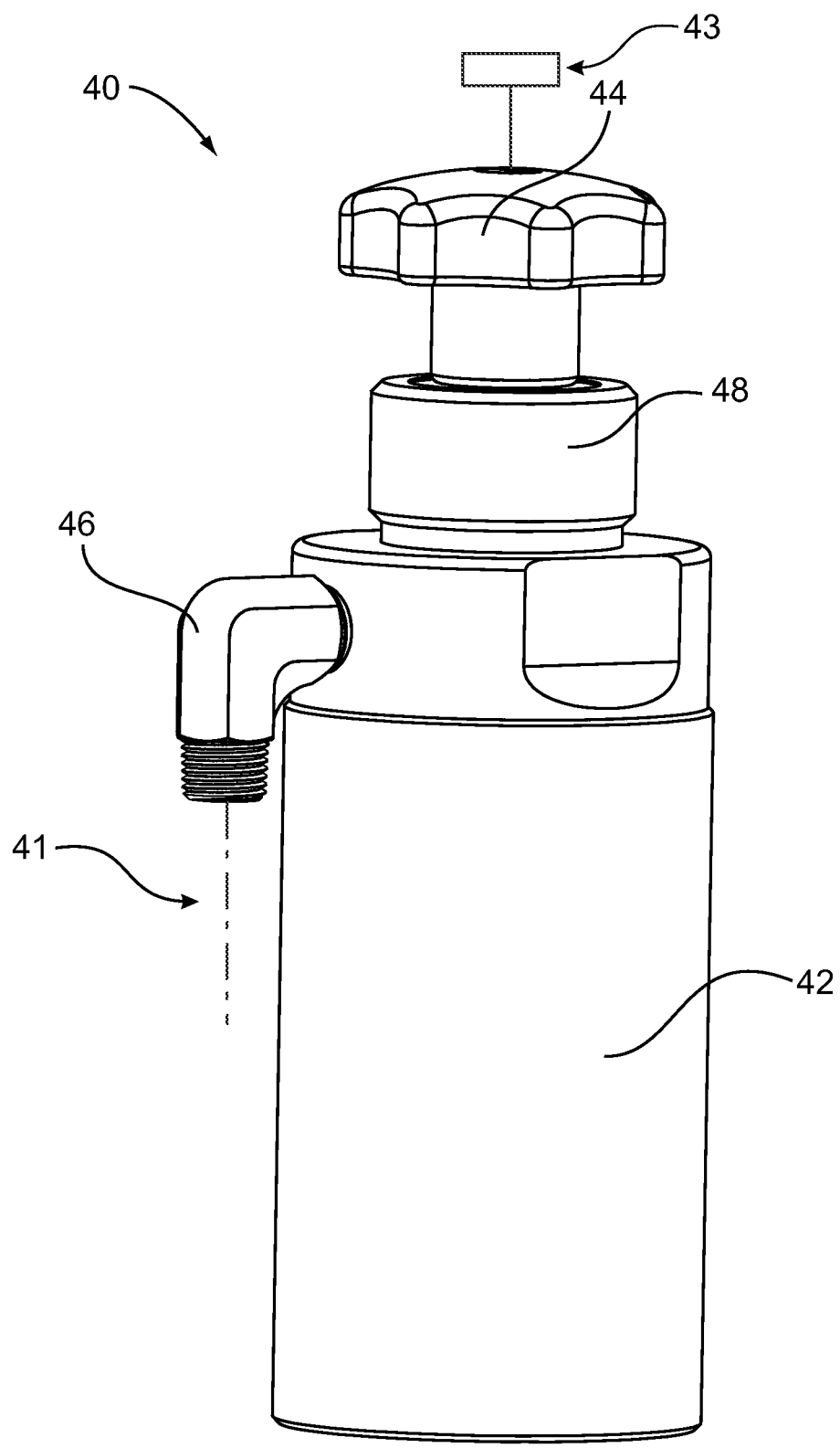
FIG. 6 is a perspective view of a valve for use with a convertible link for use with an anti-sway bar.

Referring further to the figures, FIG. 6 depicts a hydraulic valve 40 for use with convertible link 10, in accordance with embodiments of the invention. Valve 40 may comprise a reservoir tube 42 with an inner volume, a valve body 48 coupled to reservoir tube 42, a valve actuator 44 operatively coupled to valve body 48 and a valve outlet 46. Valve outlet 46 may be connected to fluid inlet 30 of convertible link 10 by one fluid hose or the like 41, to create a fluid connection between valve 40 and convertible link 10. Valve actuator 44 may be manually activated in order to direct fluid from reservoir tube through valve outlet 46, through the fluid connection and into fluid inlet of convertible link 10. This fluid is directed under pressure and is used to operate convertible link 10. Valve 40 may be located within a cockpit of off-road vehicle with easy access by a driver in order to operate convertible link 10 while driving to provide on demand conversion between semi-independent suspension and independent suspension.

Figure 10:
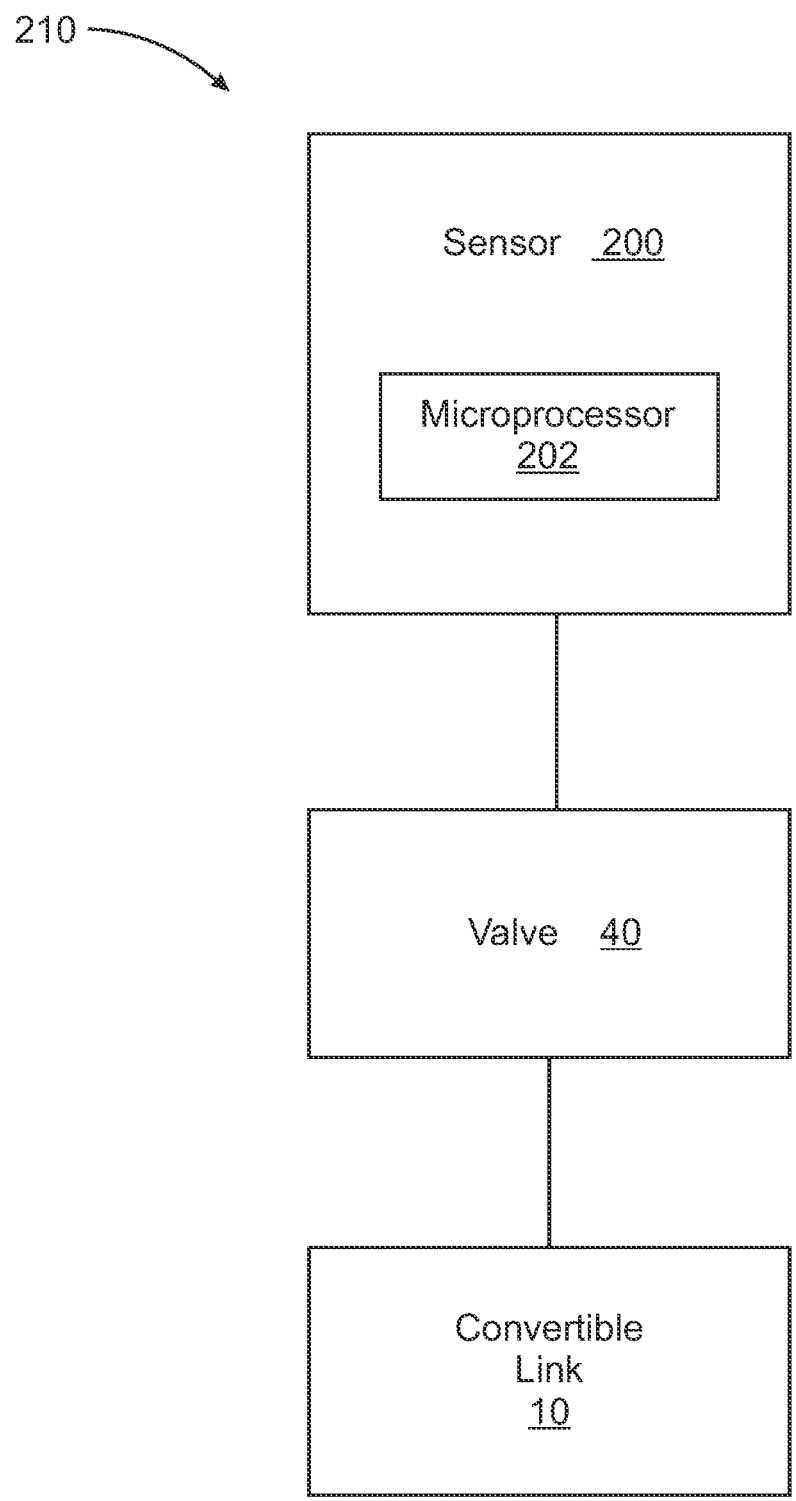
FIG. 10 is a flow chart showing a method of sensing a steering angle of steered wheels of the vehicle.

In some embodiments, as shown in FIG. 10, valve 40 may be coupled to a sensor 200 for sensing a steering angle of steered wheels of the vehicle. Sensor 200 may be coupled to any of a variety of suitable locations on the vehicle, for sensing the steering angle. For example, sensor 200 may be coupled to a tie rod or wheel hub of a steered wheel of the vehicle. In another example, sensor 200 may be coupled to the steering column of the vehicle. In any case, sensor 200 may be any sensor configured for sensing the steering angle of the vehicle. Sensor 200 may comprise components for sensing the steering angle and a microprocessor 202, wherein the microprocessor is programmed to receive signals, from the steering angle sensing components, containing information about the steering angle. Microprocessor 202 may be further programmed to send a signal to valve 40 to activate or deactivate the valve actuator 44 of valve 40, depending on the steering angle of the vehicle. In some embodiments, valve actuator 44 may be a solenoid actuator. For example, when the vehicle is steered to the right or left, such that the steering angle exceeds a predetermined value, microprocessor 202 may send a signal to activate valve 40 to provide semi-independent suspension. Then, when the vehicle steering angle is returned, such that the steering angle is at or below the predetermined value, microprocessor 202 may send a signal to deactivate valve 40 to provide independent suspension. In this manner, a convertible link 10 may provide automatic conversion between semi-independent suspension and independent suspension while the vehicle is in use.

Although microprocessor 202, as described is integral to the steering angle sensor 200, this is not intended to be limiting. In some embodiments, microprocessor 202 may be coupled to the vehicle, or to any suitable component thereof, at any location, so long as microprocessor 202 is communicatively coupled to sensor 200 and to lock valve 40.

In some embodiments, the valve may be electronically controlled, and a switch 43 may be coupled to valve 40 for engaging and disengaging the valve to open and close the valve. Alternatively, a switch may be employed to control flow of fluid to the reservoir by controlling power to any of a variety of suitable means, such as an electronically controlled magnetic fluid or electrical on/off flow restrictor in the fluid line to the reservoir, for example. The switch may be coupled to the vehicle at a location that is convenient to the driver of the vehicle, such as in the cockpit, for example. In this manner, the driver may control convertible link 10 to provide conversion between semi-independent suspension and independent suspension while the vehicle is in use.

Other hydraulic systems conventionally use two fluid hoses to connect the valve to the hydraulic cylinder 10, wherein pressure from fluid flowing through one moves the piston one direction and the then pressure from fluid flowing through the other hose moves the piston in an opposite direction. In some embodiments of the present invention, only one hose is utilized with a single inlet 30 of the convertible link 10 that is connected to the valve 40. This allows for fluid to be directed to the convertible link 10 with pressure to be utilized to move the piston 22 one direction and held under pressure to maintain the piston 22 in that position. Once the pressure is released the piston 22 can move freely in both directions. In these embodiments, the convertible link 10 may include an automatic collapse feature, wherein due to pressure in the reservoir system, wherein, for example, if the convertible link 10 is in an extended position and there is chassis clearance problem, or if the fluid pressure within the convertible link 10 reaches or exceeds a predetermined pressure, the convertible link 10 may collapse automatically. In some embodiments, the automatic collapse feature may be controlled by a microprocessor coupled to the convertible link 10 as described more fully below.

Figure 7:
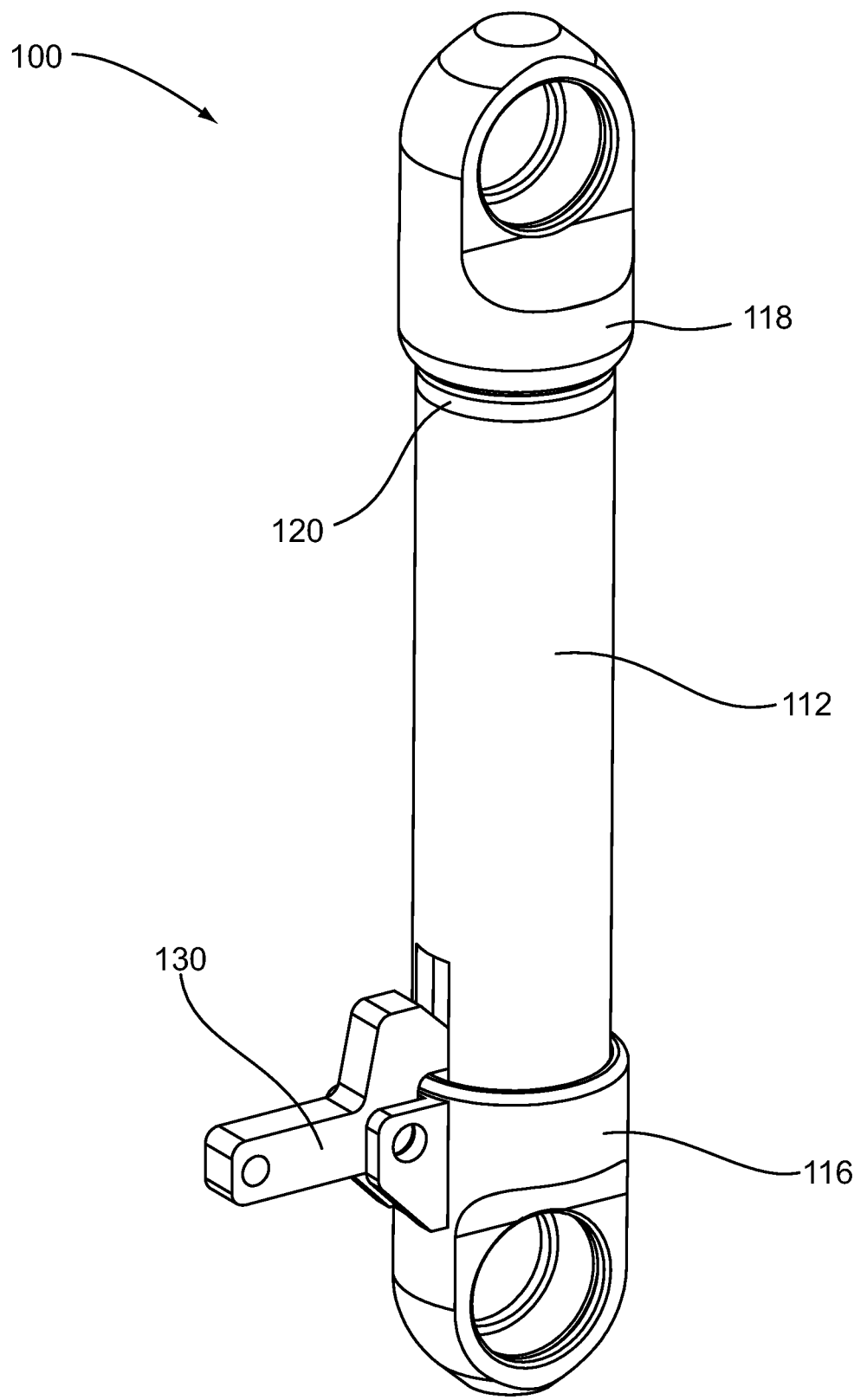
FIG. 7 is a perspective view of another convertible link for use with an anti-sway bar.
Figure 8:
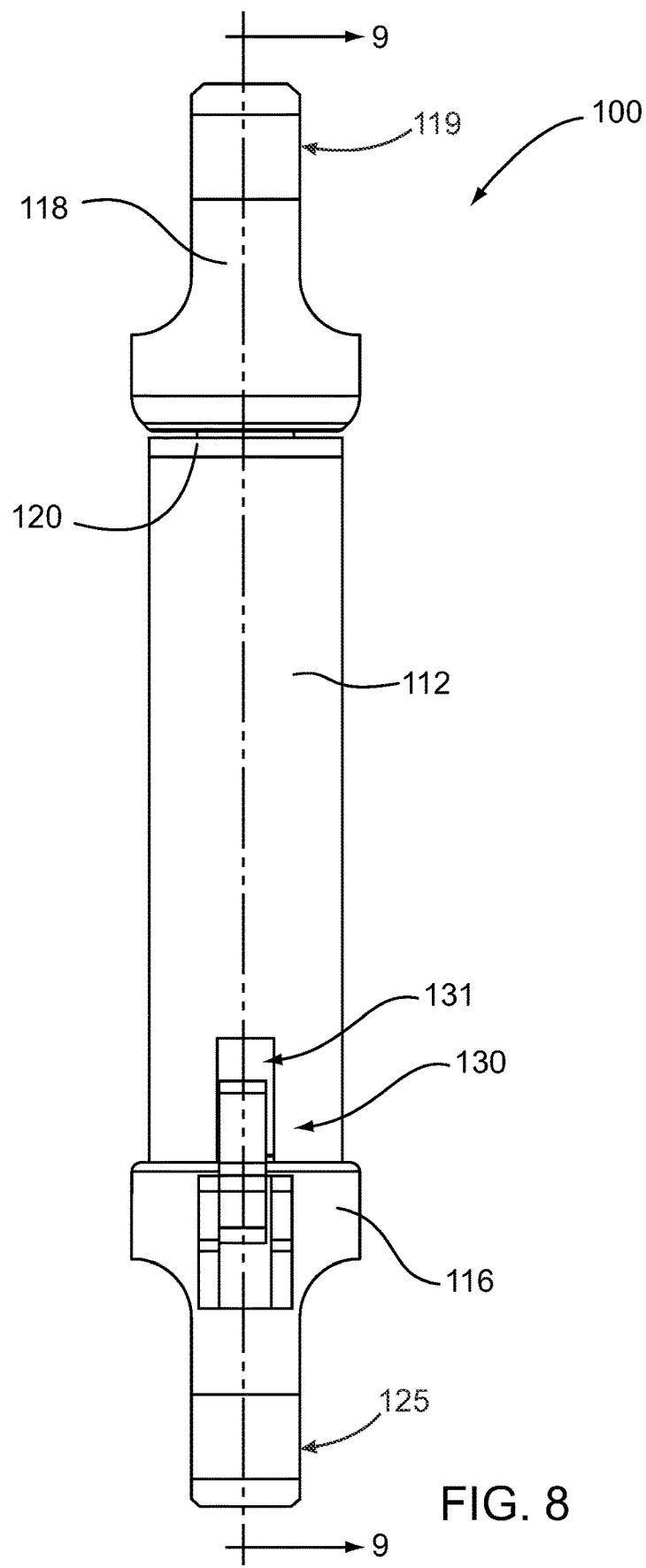
FIG. 8 is a side view of the convertible link of FIG. 7 for use with an anti-sway bar.
Figure 9:
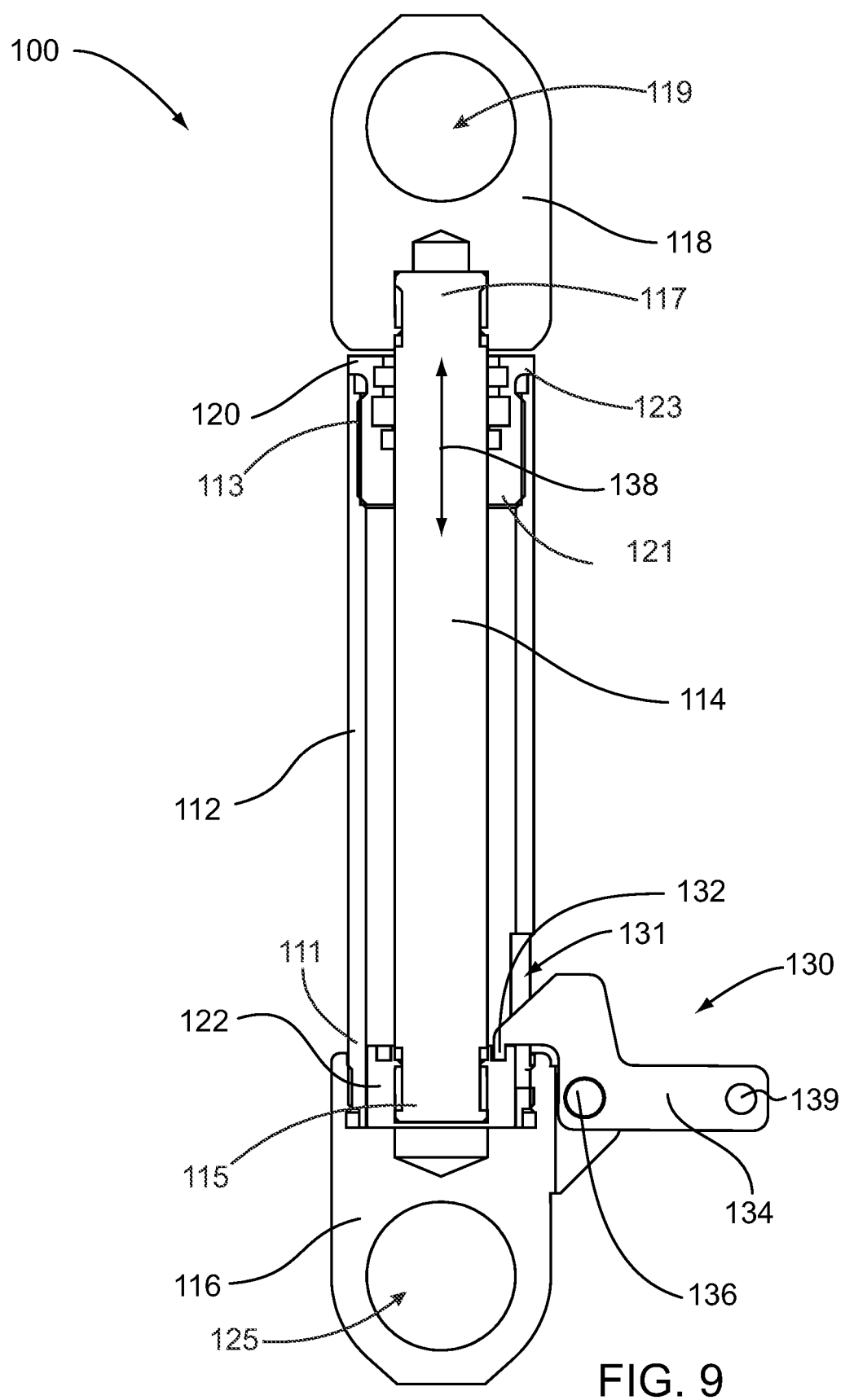
FIG. 9 is a section view taken along line 9-9 of FIG. 8 of a convertible link for use with an anti-sway bar.

Referring again to the drawings, FIGS. 7-9 depict another embodiment of a convertible link 100. Convertible link 100 may by a mechanical cylinder and include a link tube 112, a shaft 114, a link cap 116, a shaft cap 118, an end cap 120 and a piston 122. Link tube 112 may include a first end 111 and a second end 113. Link cap 116 is coupled to first end 111 of link tube 112. Link cap 116 comprises an aperture 125 used to couple link cap 116 to anti-sway bar 50. Shaft 114 may include a first end 115 and a second send 117. Piston 122 is coupled to first end 115 of shaft 114 and shaft cap 118 is coupled to second end 117 of shaft 114. Shaft cap 118 comprises an aperture 119 used to couple shaft cap 118 to control arm 56. End cap 120 includes an aperture extending through end cap 120, wherein shaft 114 extends through the aperture and end cap 120 is located between piston 122 and shaft cap 118. The inner diameter of end cap 120 may be substantially the same as the outer diameter of shaft 114. This allows for a fluid seal between shaft 114 and the inner surface of end cap 120.

Link tube 112 may include an aperture extending through the length of link tube 112, wherein piston 122 is inserted within the aperture and is slidably coupled within link tube 112. The inner diameter of link tube 112 may be substantially the same as the outer diameter of piston 122. This allows for a fluid seal between piston 122 and the inner surface of link tube 112. Additionally, end cap 210 has a protrusion 121 extending from a base 123, wherein protrusion 121 is coupled to second end 113 of link tube 112. The inner diameter of link tube 112 is of a size to interfere with the outer diameter of protrusion 121 of end cap 120. In at least this way, end cap 120 is coupled to first end 113 of link tube 112 by an interference fit, thereby providing a fluid seal between end cap 120 and link tube 112 and further axially aligning link tube 112 and shaft 114. It will be understood that while an interference fit is discussed in this disclosure, other ways of coupling end cap 120 to second end 113 of link tube 112 may be accomplished.

Link cap 116 includes a lock mechanism 130 coupled to an outer surface of link cap 116. Lock mechanism 130 may include a protrusion 132 extending therefrom, wherein protrusion 132 is configured to extend into aperture 131 located in a first end 111 of link tube 112. As protrusion 132 extends into aperture 131, it engages piston 122 in order to lock piston 122 in a fixed position with respect to link tube 122. This inhibits movement of shaft 114 in and out of link tube 112. Lock mechanism 130 may include an actuation arm 134 and a pivot rod 136 operatively coupling lock mechanism 130 to link cap 116. Actuator arm 134 may include an aperture 139 that may be used to couple to a cable or the like wherein pulling the cable applies force on actuator arm 134 resulting in rotating lock mechanism 130 about pivot rod 136 to remove protrusion 132 from within aperture 131 of link 112 to disengage piston 122. In this condition, piston 122 may slide within link tube 112 in a direction indicated by arrow 138. This movement is generally determined by the off-road vehicle suspension movement. For example, as a wheel goes over uneven surfaces, the wheel will move up and down causing the suspension to react in similar up and down rotational movements. These up and down rotational movements result in movement of piston 122 in each direction depicted by arrow 138. This results in movement of shaft 114 in and out of link tube 112.

Tension in the cable may be released and lock mechanism 130 may rotate again about pivot rod 136 and protrusion 132 may extend into aperture 131 of link tube 112. In this condition, as gravity moves the off-road vehicle into a default suspension position, lock mechanism 130 automatically engages piston 122 and locks piston 122 in a fixed position.

Accordingly, when lock mechanism 130 engages piston 122, convertible link 100 converts suspension 54 into a semi-independent suspension wherein anti-sway bar 50 is engaged to reduce roll of the vehicle while driving. When lock mechanism 130 is disengaged from piston 122, the suspension 54 is converted into an independent suspension.

In some embodiments, the lock mechanism 130 may be coupled to the convertible link 100, wherein the lock mechanism 130 prevents motion of the shaft 114 relative to the link tube 112 while in a locked configuration, and wherein the shaft 114 is free to move relative to the link tube 112 while the lock mechanism 130 is in an unlocked configuration. In some embodiments, the lock mechanism 130 may comprise a rotatable actuator arm 134 hingedly coupled to the shaft cap 118, the actuator arm 134 comprising a protrusion 132 that extends into an aperture in the link tube 112 while in the locked configuration and the protrusion 132 is removed from the aperture in the link tube 112 while in the unlocked configuration. Some embodiments may further comprise a spring (not shown) coupled between the actuator arm 134 and the shaft cap 118, wherein the actuator arm 134 is biased in the locked configuration by force of the spring on the actuator arm 134; and a cable (not shown) coupled to the actuator arm 134, wherein the force of the spring is overcome by the actuator arm 134 rotating from the locked configuration to the unlocked configuration in response to a user pulling the cable.

In some embodiments, lock mechanism 130 may be coupled to a sensor 200 for sensing a steering angle of steered wheels of the vehicle. Sensor 200 may be coupled to any of a variety of suitable locations on the vehicle, for sensing the steering angle. For example, sensor 200 may be coupled to a tie rod or wheel hub of a steered wheel of the vehicle. In another example, sensor 200 may be coupled to the steering column of the vehicle. In any case, sensor 200 may be any sensor configured for sensing the steering angle of the vehicle. Sensor 200 may comprise components for sensing the steering angle and a microprocessor 202, wherein the microprocessor is programmed to receive signals, from the steering angle sensing components, containing information about the steering angle. Microprocessor 202 may be further programmed to send a signal to lock mechanism 130 to rotate lock mechanism 30 between a locked position and an unlocked position, depending on the steering angle of the vehicle. Some embodiments may comprise an actuator, such as a solenoid actuator, for example, operatively coupled to lock mechanism 130 to control rotation of lock mechanism 130 between the locked position and the unlocked position in response to receiving a signal from microprocessor 202. For example, when the vehicle is steered to the right or left, such that the steering angle exceeds a predetermined value, microprocessor 202 may send a signal to rotate lock mechanism to a locked position to provide semi-independent suspension. Then, when the vehicle steering angle is returned, such that the steering angle is at or below the predetermined value, microprocessor 202 may send a signal to rotate lock mechanism to an unlocked position to provide independent suspension. In this manner, a convertible link 100 may provide automatic conversion between semi-independent suspension and independent suspension while the vehicle is in use.

Although microprocessor 202, as described is integral to the steering angle sensor 200, this is not intended to be limiting. In some embodiments, microprocessor 202 may be coupled to the vehicle, or to any suitable component thereof, at any location, so long as microprocessor 202 is communicatively coupled to sensor 200 and to lock mechanism 130.

According to some embodiments, the present invention may include a vehicle comprising a frame and suspension, an anti-sway bar 50 coupled to the frame; and a convertible link 10 coupled between the anti-way bar 50 and the suspension. The convertible link 10 may be a hydraulic cylinder. The convertible link 10 may include a link tube; and a fluid shaft having a piston coupled a first end of the fluid shaft, wherein the fluid shaft and the piston are slidably coupled within the link tube, wherein fluid flows in and out of the hydraulic cylinder between a fixed and a moveable condition, wherein in the fixed position, the anti-sway bar is operational to control roll and in the moveable condition, the anti-sway bar is not operational to control roll.

The vehicle may further comprise a valve 40 coupled to the vehicle and in fluid communication with the hydraulic cylinder, wherein the valve 40 controls flow of fluid into and out of the hydraulic cylinder of the convertible link 100. The hydraulic cylinder is moveable into the fixed condition in response to fluid flowed into the hydraulic cylinder and maintained under pressure by the valve. Moving the hydraulic cylinder into the fixed condition converts the suspension of the vehicle into a semi-independent suspension wherein the anti-sway bar is engaged to reduce roll of the vehicle. The hydraulic cylinder is moveable into the moveable condition in response to releasing pressure of the fluid in the hydraulic cylinder allowing fluid to freely flow in and out of the hydraulic cylinder. Moving the hydraulic cylinder into the moveable condition converts the suspension of the vehicle into an independent suspension.

In some embodiments, the vehicle may further comprise a sensor 200 for sensing a steering angle of steered wheels of the vehicle. Sensor 200 may be communicatively coupled to the valve 40. Sensor 200 may be coupled to any of a variety of suitable locations on the vehicle, for sensing the steering angle. For example, sensor 200 may be coupled to a tie rod or wheel hub of a steered wheel of the vehicle. In another example, sensor 200 may be coupled to the steering column of the vehicle. In any case, sensor 200 may be any sensor configured for sensing the steering angle of the vehicle. Sensor 200 may comprise components for sensing the steering angle and a microprocessor 202, wherein the microprocessor is programmed to receive signals, from the steering angle sensing components, containing information about the steering angle. Microprocessor 202 may be further programmed to send a signal to valve 40 to activate or deactivate the valve actuator 44 of valve 40, depending on the steering angle of the vehicle. In some embodiments, valve actuator 44 may be a solenoid actuator. For example, when the vehicle is steered to the right or left, such that the steering angle exceeds a predetermined value, microprocessor 202 may send a signal to activate valve 40 to provide semi-independent suspension. Then, when the vehicle steering angle is returned, such that the steering angle is at or below the predetermined value, microprocessor 202 may send a signal to deactivate valve 40 to provide independent suspension. In this manner, a convertible link 100 may provide automatic conversion between semi-independent suspension and independent suspension while the vehicle is in use.

Although microprocessor 202, as described is integral to the steering angle sensor 200, this is not intended to be limiting. In some embodiments, microprocessor 202 may be coupled to the vehicle, or to any suitable component thereof, at any location, so long as microprocessor 202 is communicatively coupled to sensor 200 and to valve 40.

Accordingly, the components defining any convertible link may be formed of any of many different types of materials or combinations thereof that can readily be formed into shaped objects provided that the components selected are consistent with the intended operation of a convertible link. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any convertible link may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A convertible link system, comprising:
   a hydraulic cylinder coupled between a sway bar and a control arm of a vehicle, the hydraulic cylinder comprising:
     at least one fluid outlet forming a fluid communication between a fluid line and a first inner volume;
     a fluid inlet in fluid communication with the fluid line, wherein the first inner volume expands in response to pressurized fluid flowing through the fluid inlet, through the at least one fluid outlet, and into the first inner volume, thereby causing the hydraulic cylinder to be held under pressure in a fixed position regardless of motion of the sway bar relative to the control arm, and wherein the hydraulic cylinder is moveable in response to motion of the sway bar relative to the control arm when the pressurized fluid is depressurized;
   a hydraulic valve, comprising:
     a reservoir tube having a second inner volume;
     a valve body coupled to the reservoir tube;
     a valve actuator operatively coupled to the valve body; and
     a valve outlet coupled to the reservoir tube, the valve outlet being in fluid communication between the second inner volume and the fluid inlet, wherein fluid flow between the second inner volume and the first inner volume is controlled in response to activation and deactivation of the valve actuator, wherein the valve actuator is activated in order to direct the pressurized fluid from the reservoir tube through the valve outlet via the fluid communication and into the fluid inlet of the hydraulic cylinder, wherein the pressurized fluid is directed to maintain the fixed position of the hydraulic cylinder, and wherein the hydraulic valve is located outside and separate from the hydraulic cylinder;
   a steering angle sensor configured to be coupled to the vehicle and to sense a steering angle of the vehicle; and
   a microprocessor coupled between the steering angle sensor and the hydraulic valve, wherein the microprocessor is programmed to send a signal to the hydraulic valve to activate or deactivate the valve actuator based on the steering angle to provide semi-independent or independent suspension, respectively, to the vehicle, wherein the valve actuator receives the signal in order to activate or deactivate and control opening and closing of the hydraulic valve, and wherein the hydraulic valve is open or fully closed.

2. The convertible link system of claim 1, further comprising a fluid hose coupled between the valve outlet and the fluid inlet.

3. A convertible link system, comprising:
   a hydraulic cylinder coupled between a sway bar and a control arm of a vehicle, the hydraulic cylinder comprising:
     at least one fluid outlet forming a fluid communication between a fluid line and a first inner volume;
     a fluid inlet in fluid communication with the fluid line, wherein the first inner volume expands in response to pressurized fluid flowing through the fluid inlet, through the at least one fluid outlet, and into the first inner volume, thereby causing the hydraulic cylinder to be held under pressure in a fixed position regardless of motion of the sway bar relative to the control arm, and wherein the hydraulic cylinder is moveable in response to motion of the sway bar relative to the control arm when the pressurized fluid is depressurized;
   a hydraulic valve, comprising:
     a fluid reservoir having a second inner volume;
     a valve body coupled to the fluid reservoir;
     an electronic valve actuator operatively coupled to the valve body;
     a switch coupled to the electronic valve actuator;
     a valve outlet coupled to the fluid reservoir, the valve outlet being in fluid communication between the second inner volume and the fluid inlet, wherein fluid flow between the second inner volume and the first inner volume is controlled in response to activation and deactivation of the switch, wherein the electronic valve actuator is activated in order to direct the pressurized fluid from the fluid reservoir through the valve outlet via the fluid communication and into the fluid inlet of the hydraulic cylinder, wherein the pressurized fluid is directed to maintain the fixed position of the hydraulic cylinder, and wherein the hydraulic valve is located outside and separate from the hydraulic cylinder;
   a steering angle sensor configured to be coupled to the vehicle and to sense a steering angle of the vehicle; and
   a microprocessor coupled between the steering angle sensor and the switch, wherein the microprocessor is programmed to send a signal to activate or deactivate the switch based on the steering angle to provide semi-independent or independent suspension, respectively, to the vehicle, wherein the switch receives the signal in order to activate or deactivate and control opening and closing of the hydraulic valve, and wherein the hydraulic valve is open or fully closed.

4. The convertible link system of claim 3, further comprising a fluid hose coupled between the valve outlet and the fluid inlet.

* * * * *